BOWERS, GRIGGS & WILSON,
Mole-Plow.
No. 26,082.                                   Patented Nov. 15, 1859.
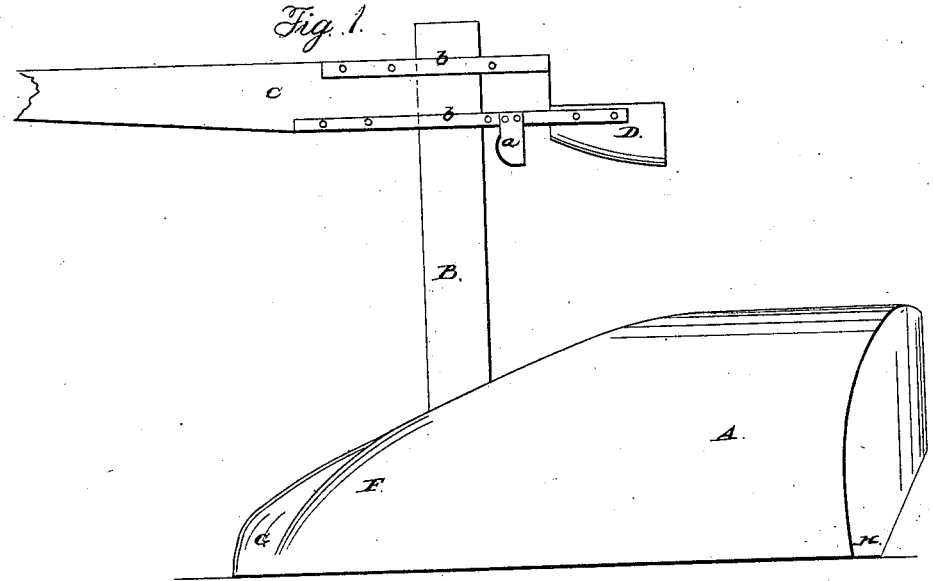
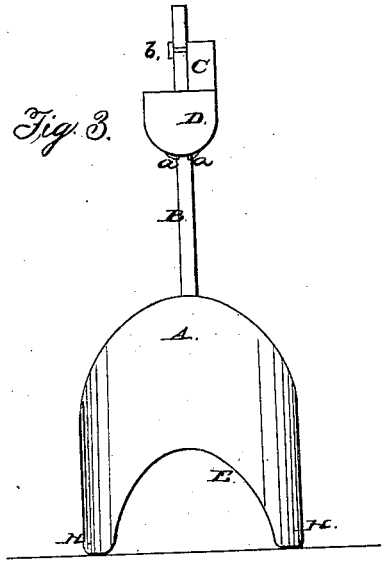

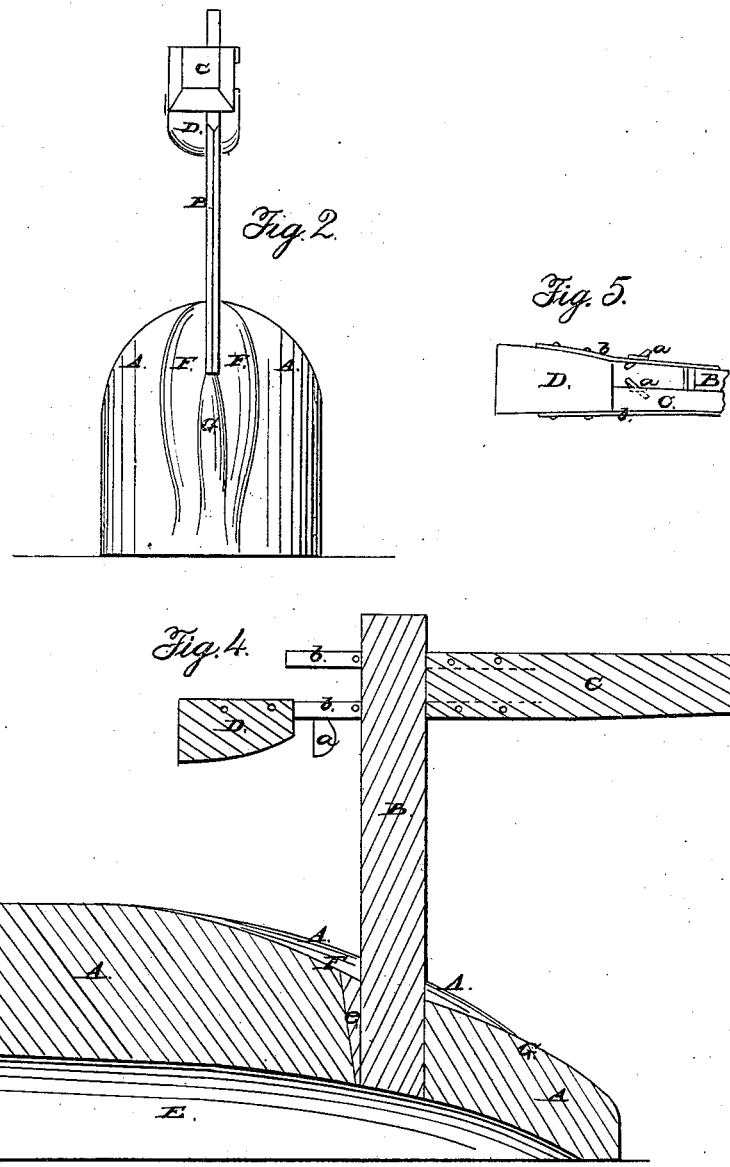

UNITED STATES PATENT OFFICE.

A. BOWERS, J. H. GRIGGS, AND J. WILSON, OF MONMOUTH, ILLINOIS.

IMPROVEMENT IN MOLE-PLOWS.

Specification forming part of Letters Patent No. 26,082, dated November 15, 1859.

*To all whom it may concern:*

Be it known that we, AARON BOWERS, JACOB H. GRIGGS, and JOHN WILSON, all of Monmouth, in the county of Warren, in the State of Illinois, have invented certain new and useful Improvements in Mole-Plows; and we do hereby declare that the following is a sufficiently full, clear, and exact description thereof to enable those skilled in the art to which our invention belongs to make and use the same, reference being had to the accompanying drawings, and to the letters of reference marked thereon, forming a part of this specification.

Figure 1 is a side view of our plow; Fig. 2, a front view; Fig. 3, a rear view; and Fig. 4, a section on line A B, Figs. 2 and 3, while Fig. 5 is a plan or top view of the presser D and scrapers *a a*.

A represents that portion of the plow called the "mole," and which runs below the surface of the ground and forms the drain.

The part A is of peculiar construction, being provided with a groove, E, which commences near the front of the bottom of the mole or plow and extending and widening back to the rear end of the same, as fully shown in Figs. 3 and 4. The part A is also provided with a top groove, F, which commences near the point of the mole or plow and extends back and up, as shown in Figs. 2, 3, and 4.

The front part of groove F is divided by the ridge G, which extends back to the front edge of the colter B, to which the draft-beam C is attached. The colter B is held in place by the wedge *e*.

To the rear end of the draft-beam C are attached two scrapers, *a. a*, and back of them a presser, D, as fully shown in the drawings. The draft-beam C is held to the colter B by bolts passing through pieces *b* in front and rear of the colter, as shown in Fig. 1, so that the beam C can be adjusted up or down on the colter B.

The operation is as follows: As the mole or plow is drawn along the front of the mole A raises up the earth and the ridge G separates it, so as to pass it on each side of the colter and up the inclined groove F, to be packed up into the cut made by the colter by the rounded rear end of the mole part A, while at the same time the scrapers *a a* scrape any loose earth thrown out above into the cut made by the colter, where it is closely packed down by the presser D. Thus it will be seen that the presser D and rear part of the mole A unite to pack the dirt into the cut made by the colter in a firm and substantial manner. The rear end of the mole A is rounded off to avoid cutting the drain when turning, while the deep bottom groove avoids much friction, and also permits the rear end of the mole A to settle down a little when the pressure happens to be very great above, the sides H H being pressed down into the ground below the earth in the center of the drain.

In the use of our mole-plow the cut made by the colter is filled up in the most compact manner, whereby the drain is protected from being filled up either by the washing in of the rubbish or being filled up by any other cause consequent upon the opening made by the colter being imperfectly closed.

Having described our invention, what we claim, and desire to secure by Letters Patent, is—

The combination of the peculiarly-constructed mole A with the scrapers *a a* and presser D, arranged and operating in relation to each other as and for the purposes set forth.

AARON BOWERS.
JACOB H. GRIGGS.
JOHN WILSON.

Witnesses:
JOHN SORTER,
T. B. BALL.